J. S. ANDRESS, Jr.
PLOW POINT FASTENER.
APPLICATION FILED SEPT. 25, 1917.

1,266,380.

Patented May 14, 1918.

Witness
J. T. L. Wright
J. W. Garner

Inventor
John S. Andress Jr.
By Victor J. Evans
Attorney

UNITED STATES PATENT OFFICE.

JOHN S. ANDRESS, JR., OF SNEADS ISLAND, FLORIDA.

PLOW-POINT FASTENER.

1,266,380.          Specification of Letters Patent.     Patented May 14, 1918.

Application filed September 25, 1917. Serial No. 193,085.

*To all whom it may concern:*

Be it known that I, JOHN S. ANDRESS, Jr., a citizen of the United States, residing at Sneads Island, in the county of Manatee and State of Florida, have invented new and useful Improvements in Plow-Point Fasteners, of which the following is a specification.

This invention relates to improvements in cultivator plows and especially with reference to the provision of improved means to fasten a plow point, shovel or the like to the standard and to securely hold the same while plowing and permit the ready removal thereof, and without the necessity of employing a heel bolt or the like and without the necessity of using a hammer, wrench or other tool when fastening or detaching a plow point; and also for adjusting a shoe or runner, the object of the invention being to provide improved devices of this character which may be readily attached to and used in connection with a plow stock of the usual form and including a beam and a standard.

The invention consists in the construction, combination and arrangement of devices hereinafter described and claimed.

In the accompanying drawings:—

Figure 1:
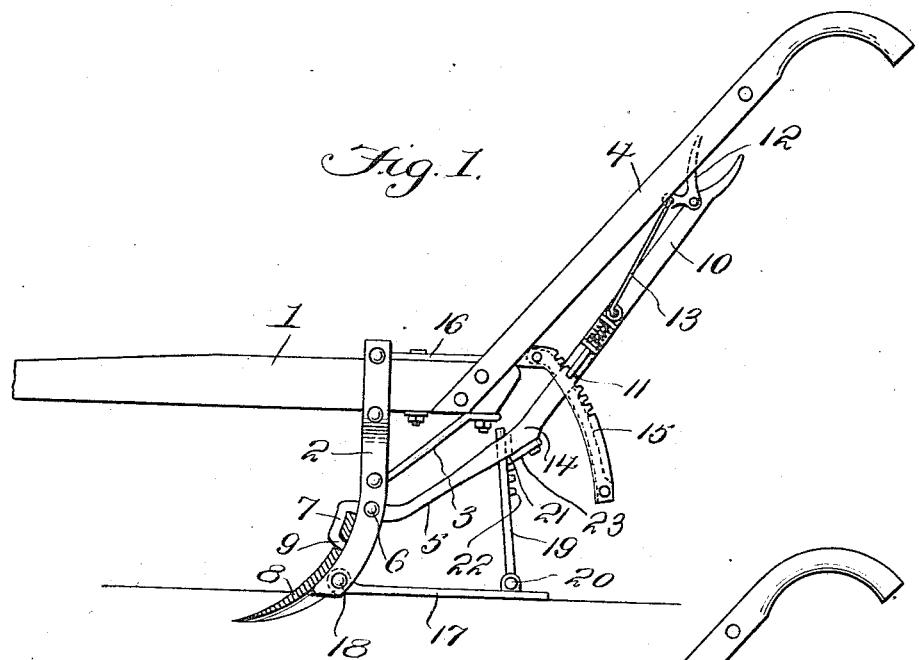
Figure 1 is an elevation, partly in section, of a plow provided with plow point fastening and shoe or runner adjusting devices constructed and arranged in accordance with my invention and showing the point fastened.
Figure 2:
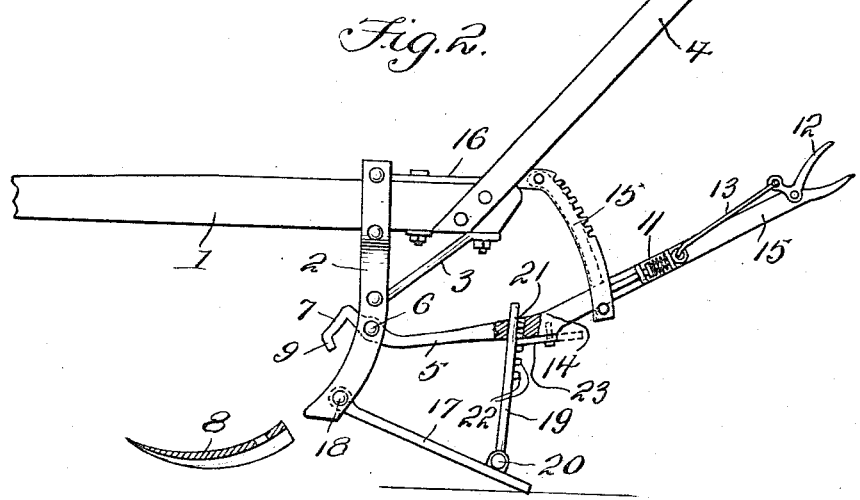
Fig. 2 is a similar view of the same, showing the point released.

For the purposes of this specification a plow stock is here shown, comprising a beam 1, standard 2, standard brace 3 and handles 4. In accordance with my invention I provide a lever 5 the front portion of which extends forwardly through the vertical slot in the standard, the said lever being pivotally mounted in the standard by means of a bolt 6. At its front end the lever is provided with a downwardly extending clamping arm 7 to bear on the front side of a plow point or shovel of any usual form and which is here indicated at 8. A lug 9 extends rearwardly from the lower side of the clamping arm 7 and is adapted to fit in the opening of the point or shovel, instead of a heel pin, such as has been heretofore commonly employed. The lever has a handle 10 secured to its rear end and said lever is provided on one side with a spring actuated dog 11 and is provided near its upper end with a trip 12 which is connected to the dog by a wire 13. The handle is bent at 14 and extends rearwardly and upwardly and is arranged behind and below the plow handles where it is out of the way and may yet be readily grasped by the plow man.

I also provide a segment 15 which is secured on the beam as at 16 and extends rearwardly and downwardly therefrom. The handle of the lever operates on one side of the segment and may be locked thereto at any adjusted position, by engaging the dog with one of the teeth or notches of the segment, as will be understood.

To release the plow point or shovel and enable the same to be removed and replaced it is only necessary to first trip the dog and to then depress the rear end of the lever, thus causing the clamping arm 7 of the lever to move upwardly and forwardly from the plow point or shovel and to withdraw the lug 9 from the opening thereof.

A shoe or runner 17 extends rearwardly from the lower end of the standard and has its front end pivotally connected thereto as at 18 so that the shoe is adjustable. A rod 19 is connected at its lower end to the landslide as at 20 and at its upper end is adjustably connected to the lever as at 21 so that the lever and rod coact to hold the shoe in the required substantially horizontal position when the plow point or plate is fastened and the plow is ready for use. The shoe moves with the lever when the latter is depressed to release the point or plate. Hence the lever not only serves as an efficient fastening means for the plow point, plate or shovel, but also serves to hold the shoe. The rod 19 has rack teeth 22, and the lever has a pivoted dog 23, for engagement with the rack teeth to hold the rod and hence the shoe at any desired adjustment.

While I have herein shown and described a preferred form of my invention, I would have it understood that changes may be made in the form, proportion and construction of the several parts without departing from the spirit of my invention and within the scope of the appended claims.

Having thus described my invention, I claim:—

1. A plow point fastener comprising a lever arranged to be pivoted to a plow standard and having a downwardly extending clamping arm at its front end to bear against the front side of a plow point and thereby hold the point between the standard and said clamping arm, said clamping arm being provided with a rearwardly extending lug to enter the opening of the plow point, and means to secure the lever in adjusted position.

2. In combination with a plow stock including a beam and a standard, a lever pivotally mounted and extending forwardly through the standard, said lever having a downwardly extending clamping arm at its front end to clamp the plow point between the standard and said arm and a rearwardly extending lug at the lower end of said arm to enter the opening of the plow point, and a segment attached to the plow beam and against which the lever operates, the lever being provided with a dog to engage said segment to lock the lever in adjusted position.

3. In combination with a plow stock including a beam and a standard, a lever pivotally mounted and extending forwardly through the standard, said lever having a downwardly extending clamping arm, at its front end, to clamp the plow point between the standard and said arm and a rearwardly extending lug, the lower end of said arm to enter the opening of the plow point, a segment attached to the plow beam and against which the lever operates, the lever being provided with a dog to engage the segment to lock the lever in adjusted position, a shoe pivotally connected to and extending rearwardly from the standard and a rod connecting the shoe with the lever so that the latter and the rod serve to hold and adjust the shoe.

In testimony whereof I affix my signature.

JOHN S. ANDRESS, Jr.

Copies of this patent may be obtained for five cents each, by addressing the "Commissioner of Patents, Washington, D. C."